United States Patent [19]

Le Corre et al.

[11] Patent Number: 4,777,795

[45] Date of Patent: Oct. 18, 1988

[54] DEVICE FOR VARYING THE THRUST OF A PROPULSION SYSTEM USING A SOLID PROPELLANT

[75] Inventors: Alain M. Le Corre, Colombes; Max Jean-Pierre Calabro, Nanterre; Gilles B. Vigier, Aubergenville; Patrick Comtesse, Verneuil s/ Seine; Jean-Francois Beau, St Ouen L'Aumône, all of France

[73] Assignee: Aerospatiale Societe Nationale Industrielle, France

[21] Appl. No.: 15,940

[22] Filed: Feb. 18, 1987

[30] Foreign Application Priority Data

Feb. 18, 1986 [FR] France ............... 86 02148

[51] Int. Cl.[4] .................. F02K 1/06; F02K 9/05
[52] U.S. Cl. ........................ 60/234; 60/254; 60/242; 239/265.19
[58] Field of Search ............... 60/234, 235, 254, 253, 60/247, 232, 242; 251/62, 63, 903; 239/265.11, 265.19, 456

[56] References Cited

U.S. PATENT DOCUMENTS

| | | |
|---|---|---|
| 3,069,846 | 12/1962 | Buescher ............ 137/625.34 |
| 3,073,112 | 1/1963 | Bleikamp, Jr. ............ 60/254 |
| 3,319,423 | 5/1967 | Caraher ............ 60/264 |
| 3,349,565 | 10/1967 | Williams ............ 60/254 |
| 3,608,312 | 9/1971 | Miltenberger ............ 60/242 |
| 3,726,480 | 4/1973 | Miltenberger ............ 60/232 |
| 3,943,708 | 3/1976 | Panella ............ 60/242 |
| 3,948,042 | 4/1976 | Beardsley et al. ............ 60/242 |

Primary Examiner—Louis J. Casaregola
Assistant Examiner—Timothy S. Thorpe
Attorney, Agent, or Firm—McGlew and Tuttle

[57] ABSTRACT

The device comprises, at the outlet of the combustion chamber 3, a movable assembly comprising a hollow closure member 26 constituting a needle 27, a thermal shield 22 and an annular piston 14. This closure member acts as a piston under the effect of the pressure of the gases and drives the annular piston so as to expel a hydraulic fluid from a jack chamber 33 having an adjustable outlet 34. The closure member 26 defines a chamber 28 for calming the gases.

6 Claims, 1 Drawing Sheet

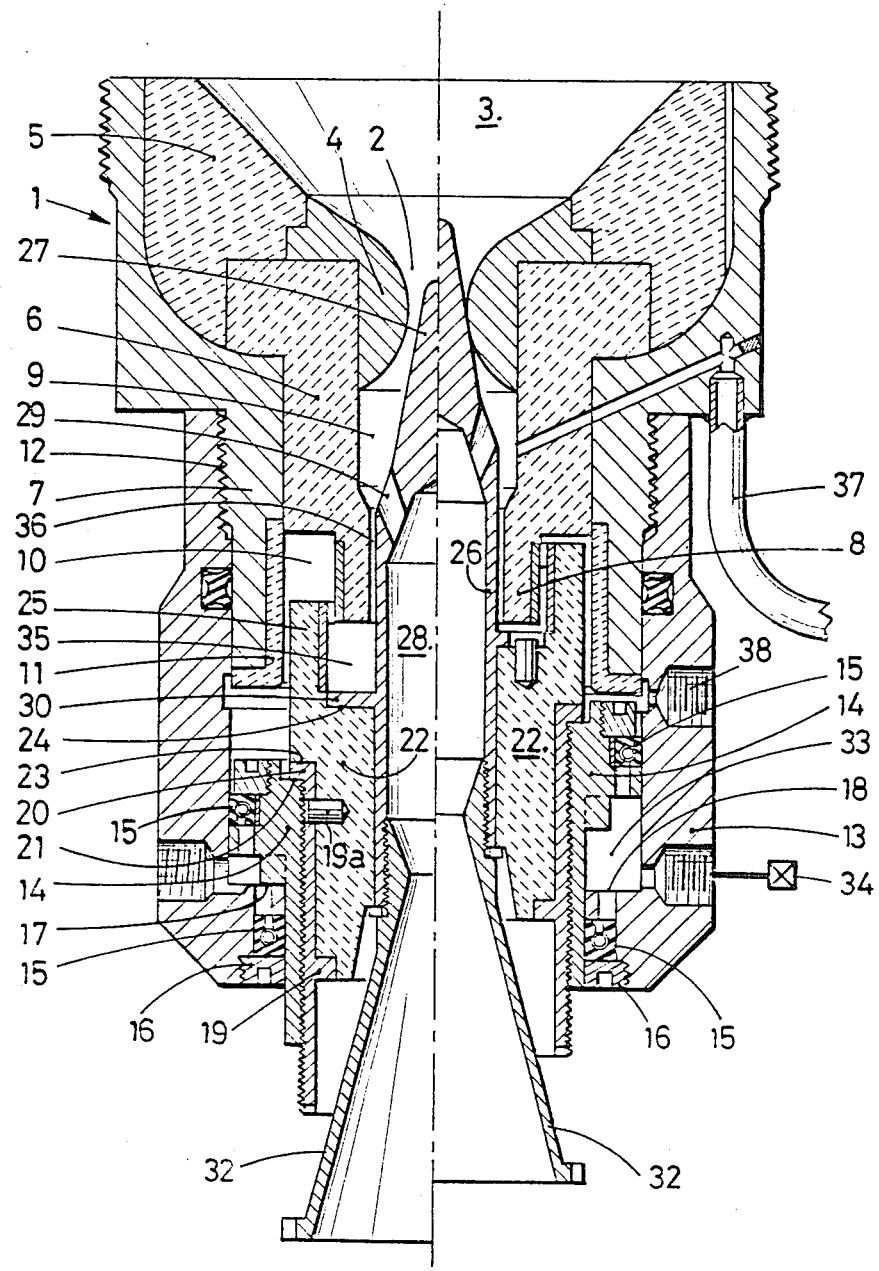

DEVICE FOR VARYING THE THRUST OF A PROPULSION SYSTEM USING A SOLID PROPELLANT

FIELD AND BACKGROUND OF THE INVENTION

The present invention relates to the regulation of the thrust of a propulsion system and concerns more particularly a device for varying the thrust of a propulsion system using a solid propellant.

The variation in the modulus of the thrust vector of a propulsion system may be obtained either by varying the flow of the gases or by deviating a part of the gases axially in a direction opposed to the main thrust or radially in a symmetrical manner.

The variation in the flow may be effected either directly by controlling the quantity of propellant at the inlet of the chamber or indirectly by regulating the outlet section of the chamber.

In the case of a liquid propellant, the control of the flow at the inlet of the chamber presents no difficulty. On the other hand, in the case of a solid propellant, in respect of which the combustion chamber performs at the same time a storage function, only the solution of the regulation of the outlet section can be used in the region of the throat of the nozzle.

When a propellant whose combustion rate is very sensitive to pressure is used, any variation in the section of the throat of the nozzle produces a variation in the combustion pressure and consequently a variation in the flow.

Various devices for regulating the section of a nozzle are already known. Among the prior art there may be cited in particular U.S. Pat. Nos. 3,069,846 and 3,192,710 which disclose devices comprising needle-valves disposed upstream of the throat of the nozzle.

U.S. Pat. No. 3,069,846 relates to a thrust regulating device comprising a closure member formed by a rising valve member whose conical head extends into the throat of the nozzle and which is actuated by an electromagnet.

This device entails a bent path for the outlet of the gases. It is consequently bulky and inapplicable in many cases.

U.S. Pat. No. 3,192,710 discloses a device in which an annular cam mounted around the nozzle is actuated by motors for shifting the nozzle itself axially with respect to a fixed probe or needle.

This device is also bulky owing to the necessary position of its components around the convergent-divergent structure and this bulkiness also limits its applications. U.S. Pat. Nos. 3,726,480 and 3,943,708 disclose devices in which a movable element, or needle, is disposed in the nozzle on the downstream side with respect to the flow of the gases and is displaced axially in the throat of the nozzle by a system of jacks.

Not only is the mechanism of these devices relatively complicated, it is completely immersed in the hot gases which at least impairs the operation of the device whose thermal insulation is extremely difficult to achieve.

SUMMARY AND OBJECTS OF THE INVENTION

An object of the invention is to overcome these drawbacks by providing a device for varying the thrust of a propulsion system using solid propellant, which device has a simple mechanism substantially insensitive to the heat of the propulsion gases and has an extremely reduced overall size.

The invention therefore provides a device for varying the thrust of a propulsion system using a solid propellant whose combustion rate is sensitive to pressure, by regulating the section of the passage of the nozzle, of the type comprising a needle axially adjustable in the outlet throat of the combustion chamber and disposed on the downstream side of the throat, characterized in that it comprises, at the outlet of the combustion chamber, an assembly telescopically movably mounted in a jack body, the assembly being exposed to the pressure of the combustion gases and constituting both a needle closure member for the combustion chamber and a piston for the jack, and adjustable means for controlling the displacement of the assembly under the action of the combustion gases.

According to other features of the invention, the assembly defines a second chamber for calming the gases which is movable relative to the combustion chamber.

According to an embodiment, the movable assembly comprises a closure member constituting a needle and a thermal shield surrounding said closure member and defining an annular chamber with said body.

Preferably, the closure member is hollow; and has a first upstream end constituting a needle engaged in the outlet throat of the combustion chamber, a body defining said second chamber adapted to communicate with the combustion chamber, and a diffuser.

Advantageously, the thermal shield at least partly surrounds the body of the closure member.

The following description, with reference to the accompanying drawing given by way of a non-limiting example, will explain how the invention can be put into practice.

BRIEF DESCRIPTION OF THE DRAWINGS

The single FIGURE is a longitudinal sectional view of the device according to the invention mounted on the outlet end of a combustion chamber of a solid propellant, the right half showing the movable assembly in the retracted position in which the needle or probe closes the outlet throat of the combustion chamber, while the left half shows it in the completely extended position in which the second chamber, formed in the closure member, communicates with the combustion chamber.

With reference to the drawing, reference numeral 1 generally designates the outlet end of a combustion chamber of a solid fuel whose combustion rate is sensitive to the pressure of the gases.

In the known manner, the outlet throat 2 of the combustion chamber 3 is defined by linings of composite material resisting high temperatures, for example of carbon-carbon, ceramic, phenolic carbon, metallic composite or other materials 4, 5 and 6.

The body of the combustion chamber has a cylindrical extension 7 which extends a little beyond the throat 2 and in the interior of which partly extends the lining 6 forming a thermal shield, this lining 6 defining with the lining 4 forming the throat or nozzle 2 with a control axis, downstream of the latter, a space 9 and including a skirt 8 extending in the downstream direction parallel to the wall of the extension 7 and defining with the latter wall an annular chamber 10.

Preferably, in the region of the annular chamber 10, the wall of the extension 7 is also covered with a thermal protection lining 11.

The extension 7 is externally screw threaded as shown at 12 for receiving the assembly according to the invention for the purpose of varying the thrust of the propulsion system.

This assembly comprises a body 13 which has an internal screw thread and is screw threadedly engaged on the extension 7.

Slidably mounted in the body 13 is an annular piston 14, a seal being provided between the piston and the body 13 by sealing elements 15 of which one, in the vicinity of the downstream end of the body 13, is maintained in the latter by a ring 16.

The annular piston 14 has, roughly halfway along its length, an outwardly projecting radial shoulder 17, and the body 13 has at its downstream end a complementary inner radial shoulder 18.

The annular piston 14 surrounds a connecting element 19 formed by a cylindrical sleeve having an outer radial flange 20 at its upstream end in contact with a corresponding shoulder 21 on the piston 14.

The sleeve 19 provides the connection between the piston 14 and a cylindrical thermal shield 22, for example of carbon-carbon, ceramic-ceramic or other material, to which it is secured by screws 19a.

The thermal shield 22 has an outer radial shoulder 23 cooperating with an outer radial shoulder 20 on the sleeve 19. It further comprises an inner bore in which a shoulder 24 defines two parts of different diameters, the part having the larger diameter constituting a ring 25 having a thickness roughly equal to the width of the chamber 10 between the skirt 8 and the extension 7.

Disposed axially in the second part of the bore of the thermal shield 22 having the smaller diameter, is a hollow closure member having a cylindrical body 26 including an upstream end or nose 27 of roughly conical shape. The nose 27 is adapted to enter the throat 2 and move therein between a position in which it completely closes the throat (the right half of the FIGURE) and an infinity of positions determining annular openings of variable section of this throat (left half of the FIGURE).

The nose 27 and the body 26 define an inner combustion gas chamber 28 adapted to communicate with the space 9 through the vents 29 provided at the base of the conical nose 27.

The body 26 of the closure member has in its median part an outer radial flange 30 which is complementary to the shoulder 24 of the thermal shield 22 to which it is secured.

Fixed to the end of the body 26 remote from the nose 27, or the downstream end, is a diffuser 32 defining a neck at the outlet of the chamber 28.

The inside diameter of the skirt 8 of the lining 6 into which partly extends the body of the closure member 26 upstream of the flange 30, is a little greater than the outside diameter of the closure member so as to leave an annular passage 36 therebetween which puts the space 9 in communication with the flange 30.

It will be understood that the arrangement is such that the closure member 26, 27 the thermal shield 22 with which it is integral, the diffuser 32 the connecting element 19 and annular piston 14 may slide together in the body 13 between the position shown in the right half of the FIGURE, in which the nose 27 completely closes the throat 2 and in which the annular piston 14 may be urged upwardly with its shoulder 17 spaced away from the shoulder 18 of the body 13, thus defining an annular chamber or second annular chamber 33, under the pressure of a hydraulic fluid introduced by an adjustable device or hydraulic fluid relief conduit 34 connected to a tank through a valve (not shown), and a position of complete or partial opening represented in the left part of the FIGURE.

When, in this closed position, the propellant is ignited, the pressure of the gases in the combustion chamber 3 tends to urge back the closure member 26 and clear the throat 2 while shifting along therewith the thermal shield 22, the connecting element 19 and the piston 14.

This rearward movement is stopped by the hydraulic fluid enclosed in the second annular chamber or jack chamber 33 by the shoulder 17 of the piston 14 which thus forms a jack which is connected to members 26, 27, 22, 32 and 19 of the nozzle closure assembly with the escape of hydraulic fluid being controlled.

As soon as this fluid starts to escape, the closure member 26 continues to move rearwardly and the gases can pass, on one hand, through the vents 29 into the inner chamber 28 and, on the other hand, through the annular passage 36 and reach the flange 30.

As the latter has moved slightly rearwardly, it defines with the downstream end of the skirt 8 an annular chamber 35 of variable volume and the pressure of the gases in this chamber acts on the flange or outer peripheral flange 30, constituting a piston, which thus tends to move back the closure member-thermal shield-connecting element-piston assembly.

As the hydraulic fluid is allowed to escape from the chamber 33 of the jack body or jack chamber 33, the volume of the first chamber 35 increases, the closure member 26 moves rearwardly, the nose 27 progressively clears the throat 2 and the volume of the chamber 33 of the jack decreases possibly to a zero value.

Thus it will be understood that the piloting of the system is limited to controlling the outlet flow of the hydraulic fluid through the adjustable nozzle 34 by means of the pressure prevailing in the combustion chamber, as a function of the desired thrust law. The jack chamber 33, annular piston 14 and adjustable device 34 forming displacement retarding means for retarding the displacement of the jack body.

The fields of application of the invention concern problems related to the propulsion of rockets. The invention is therefore applicable to rockets which need to satisfy the following mission requirements:

of a motor having a variable thrust whose evolution with respect to time is controlled by a feedback loop, this evolution of the thrust therefore not being predetermined;

of a motor having a variable thrust of very small size in diameter and of low mass, which implies among other things that the activation of the closing mechanism has no need of a particular source of energy which puts a limit on the specification as concerns mass.

However, if the movement of the movable assembly is limited to an opening movement, the domain of the possible thrust law depends on the design of the block of propellant.

For example, if the block of propellant is a tubular block having inhibited surfaces giving, for a constant outlet section, a strongly increasing thrust law (law 1)

within a domain limited by the mass of the carried propellant, it is possible to obtain:

constantly increasing laws (1, 1');

laws having steps (2, 2', 2") which may or may not be followed by increasing stages;

more complex laws alternating increasing and decreasing stages.

The originality of the invention resides in the design of the system developed for obtaining a variable thrust with a propulsion system using a solid propellant.

This system is based on:

Means for actuating the closure member which do not require a particular source of energy, the energy for the actuation being supplied by the propulsion gases.

The pressure of the propulsion gases exerted on the closure member forming a needle permits the compression of a hydraulic jack whose moving assembly (comprising the second chamber) constitutes the piston; it is then sufficient to control the escape of the jack for controlling the opening of the system. If a hydraulic generation system is provided in the jack, it becomes possible to control both the closure and the opening; the thrust then becomes adjustable within a wide range.

The needle which constitutes the closure member is placed downstream of the throat and is integral with the movable assembly with the second chamber.

The integration of a second chamber integral with the downstream needle permits a reduction in the forces exerted on the needle and therefore a lightening of the mechanical structure carrying it.

Owing to the second chamber and the second throat of fixed section, the aerodynamic flow in the nozzle is of revolution; its mean line is on the axis of the nozzle. The thrust is proportional to the pressure in the second chamber. This conception therefore simplifies the feedback loop since the thrust may be controlled by a single parameter:

the pressure in the second chamber.

The hydraulic mechanism which controls the actuation of the closure member is not completely immersed in the hot gases so that it is possible to solve the problems of thermal insulation more simply with less mass and smaller size.

As the actuating means for the closure member are for large part outside the flow, they can be placed in the throat-diffuser zone which of course affords an available volume, which avoids exceeding the diameter of the cylinder of the first chamber.

This device is designed to operate with hot gases.

The use of two expansion chambers, on one hand, results in a more homogeneous jet issuing from the nozzle, the turbulences being attenuated in the chamber 28 and, on the other hand, limits the thrust on the jack (thrust force opposing the pressure force).

The reference numerals 37 and 38 designate outlet means adapted to receive temperature and pressure sensors.

What is claimed is:

1. A propulsion device for use with a solid propellant in which the propulsion rate is sensitive to pressure in a combustion chamber comprising: a combustion chamber body defining a combustion chamber having a nozzle with a central axis and an upstream side and a downstream side providing an outlet for combustion gas, said combustion chamber body including a cylindrical extension with a central axis substantially coincident with said nozzle central axis; a nozzle closure assembly positioned on said nozzle downstream side within said combustion chamber body for movement in an axial direction for opening and closing said nozzle, said nozzle closure assembly including a closure member movable into said nozzle upon movement of said nozzle assembly for variably restricting combustion gas flow through said nozzle, a cylindrical body defining an inner combustion gas chamber, said cylindrical body being positioned in said cylindrical extension spaced from said inner surface of said cylindrical extension, at least one vent provided in said nozzle closure assembly allowing combustion gas to flow from a space downstream of said nozzle into said inner combustion gas chamber, and a diffuser connected to said cylindrical body for passage of combustion gas to atmosphere; and, an annular piston connected to said nozzle closure assembly for movement therewith including two piston faces cooperating with said cylindrical extension to form a first annular chamber and cooperating with said cylindrical extension to form a second annular chamber, said first annular chamber being in fluid communication with said space downstream of said nozzle thereby allowing combustion gas to act on said piston and said second annular chamber being filled with hydraulic fluid and being connected to a hydraulic fluid release conduit, combustion gases in said first annular chamber urging said piston and said closure member in a direction away from said nozzle and hydraulic fluid in said second annular chamber resisting movement of said piston and said closure member in a direction away from a said nozzle.

2. A propulsion device according to claim 1, wherein, said first annular chamber is connected with said space downstream of said nozzle through an annular passage disposed between said cylindrical body and said cylindrical extension, a thermal shield lining being positioned between said cylindrical extension and said annular chamber.

3. A propulsion device according to claim 2, wherein: said closure member is of a conical shape at the base of which said vents are provided.

4. A propulsion device according to claim 1, wherein: said annular piston is connected to said to said nozzle closure assembly by means of an outer radial flange connected to said cylindrical body and a thermal shield surrounding said cylindrical body.

5. A propulsion device according to claim 1, wherein: said hydraulic relief conduit includes an adjustable nozzle for regulating the flow of hydraulic fluid therethrough.

6. A propulsion device according to claim 1, wherein: said diffuser is positioned at an extreme downstream side relative to said nozzle of said nozzle closure assembly.

* * * * *